United States Patent
Hengl et al.

(10) Patent No.: US 10,456,790 B2
(45) Date of Patent: Oct. 29, 2019

(54) MACHINE FOR TREATING INFECTIOUS WASTE, IN PARTICULAR MEDICAL WASTE

(71) Applicant: TESALYS, Lyons (FR)

(72) Inventors: Patrick Hengl, Lourdel (FR); Emmanuel Hengl, Calmont (FR)

(73) Assignee: TESALYS, Lyons (FR)

( * ) Notice: Subject to any disclaimer, the term of this patent is extended or adjusted under 35 U.S.C. 154(b) by 526 days.

(21) Appl. No.: 15/206,746

(22) Filed: Jul. 11, 2016

(65) Prior Publication Data

US 2016/0318030 A1    Nov. 3, 2016

Related U.S. Application Data

(63) Continuation of application No. PCT/IB2015/051056, filed on Feb. 12, 2015.

(30) Foreign Application Priority Data

Feb. 14, 2014 (FR) ..................... 14 51172

(51) Int. Cl.
*B02C 18/22* (2006.01)
*B02C 19/00* (2006.01)
(Continued)

(52) U.S. Cl.
CPC ...... *B02C 18/2233* (2013.01); *B02C 18/0084* (2013.01); *B02C 18/142* (2013.01);
(Continued)

(58) Field of Classification Search
CPC . B02C 18/2223; B02C 18/182; B02C 18/142; B30B 9/321; B30B 9/325; B30B 1/006
(Continued)

(56) References Cited

U.S. PATENT DOCUMENTS 3,722,404 A * 3/1973 Moon ..................... B30B 1/006
                                              100/295
3,774,882 A    11/1973 O'Connor, Jr.
(Continued)

FOREIGN PATENT DOCUMENTS

CN    202224439 U    5/2012

OTHER PUBLICATIONS

International Search Report issued for corresponding International Patent Application No. PCT/IB2015/051056, dated May 15, 2018, with an English translation.
(Continued)

*Primary Examiner* — Shelley M Self
*Assistant Examiner* — Jared O Brown
(74) *Attorney, Agent, or Firm* — Myers Wolin, LLC.

(57) ABSTRACT

A machine is provided including a receptacle for loading waste, a shredder, and a pusher to push waste toward the shredder. The receptacle has a constant cross-section between a waste loading opening and a communication opening with the shredder, and the pusher is a plate translatable in the receptacle, parallel to the axis along which the receptacle has the constant cross-section. The plate is dimensioned such that only an interstice exists between the plate edge wall and the walls defining the receptacle; the plate is movable between a withdrawn position able to be freed from said waste loading opening, and an end-of-travel position situated near the communication opening. The machine comprises a sealing gasket movable between a retracted position, which does not hinder the mobility of the plate in the receptacle, and a sealing position, which produces, in the end-of-travel position of the plate, sealing between the plate and the receptacle walls.

9 Claims, 5 Drawing Sheets

(51) Int. Cl.
    *B09B 3/00*              (2006.01)
    *B02C 18/00*           (2006.01)
    *B02C 18/14*           (2006.01)
    *B02C 18/18*           (2006.01)

(52) U.S. Cl.
    CPC ........ *B02C 18/182* (2013.01); *B02C 19/0075* (2013.01); *B09B 3/0075* (2013.01); *B02C 2018/188* (2013.01)

(58) Field of Classification Search
    USPC .................................. 241/280, 282; 100/283
    See application file for complete search history.

(56) References Cited

U.S. PATENT DOCUMENTS

| | | | | |
|---|---|---|---|---|
| 4,027,584 A * | 6/1977 | Sly | ........................ | B30B 9/3057 100/218 |
| 5,054,696 A | 10/1991 | Mennel et al. | | |
| 5,150,843 A | 9/1992 | Miller et al. | | |
| 6,314,852 B1 * | 11/2001 | Long | ........................ | B26D 7/26 100/219 |
| 6,658,999 B1 * | 12/2003 | Schoch | ............... | B30B 15/0088 100/214 |
| 7,913,617 B1 * | 3/2011 | Espey | ................ | B29B 17/0052 100/226 |
| 2008/0213124 A1 * | 9/2008 | Hengl | ..................... | A61L 11/00 422/1 |

OTHER PUBLICATIONS

WiSEED, "TESALYS—Startup en vote sur WiSEED avec MIDINVEST" animated, dated Nov. 13, 2013. (URL: https://www.youtube.com/watch?v=jwMvNWzczek&feature=player_detailpage).

Office Action issued by the State Intellectual Property Office of China for corresponding Chinese Patent Application No. 201580005406.1, dated May 3, 2018, with an English translation.

\* cited by examiner

MACHINE FOR TREATING INFECTIOUS WASTE, IN PARTICULAR MEDICAL WASTE

CROSS REFERENCE TO RELATED APPLICATIONS

This application is a continuation of International Patent Application No. PCT/IB2015/051056, filed Feb. 12, 2015, now pending, which claims foreign priority to French Patent Application No. FR 14 51172, filed Feb. 14, 2014, the disclosure of which are herein wholly incorporated by reference.

The present invention relates to a machine for treating infectious waste, in particular medical waste.

BACKGROUND OF THE INVENTION

The law requires that infectious waste, in particular medical waste, be shredded such that it is not recognizable or reusable, and above all such that it can be highly sterilized. To that end, it is known to use a shredding and sterilizing machine for such waste, comprising an upper hopper for receiving waste, a median shredding compartment, and a lower tub for receiving, sterilizing and discharging shredded waste.

The median shredding compartment includes a shredder formed from a parallel series of contrarotating knives, the knives in one series alternating with counter-knives. The knives in one series cooperate with the counter-knives in another, adjacent series, and vice versa.

The waste tending not to be captured by the knives of the shredder and to remain in the hopper, it has in particular been considered to equip the hopper with a flexible sheath for receiving and coating the waste, traveling with the waste toward the shredder and intended to be shredded with the waste; it has also been considered to equip the hopper with a steerable shaft for pushing the waste toward the shredder.

The median shredding compartment and the lower tub must be sterilized using pressurized steam between each waste treatment cycle, which means tightly closing the opening that exists between the bottom of the hopper and the median shredding compartment. This closing is done using a sliding hatch.

The existing machines of this type are globally satisfactory, but may nevertheless still be perfected.

Indeed, the aforementioned steerable shafts are not always very effective and involve the presence of an operator. The sliding hatch risks trapping waste between it and its sliding seat when it closes, which leads to a risk of incomplete closing of this hatch and the exertion of unwanted additional and repeated forces on the means for actuating the hatch. Furthermore, fragments of waste tend to rise more or less from the shredder and accumulate in said seat, consequently requiring frequent cleaning of said seat. Furthermore, the sliding hatch makes it necessary to provide means for disinfecting the hopper that are separate from the means for disinfecting and sterilizing the median shredding compartment and the lower receptacle, which also makes the structure and operation of the device more complex.

OBJECTS OF THE INVENTION

The present invention primarily aims to resolve all of these drawbacks.

Documents U.S. Pat. Nos. 5,054,696 A, 5,150,843 A and 3,774,882 A describe various machines, not making it possible to achieve this aim completely.

SUMMARY OF THE INVENTION

The machine comprises a receptacle for loading waste, a shredding assembly for shredding said waste, including a shredder, and a pushing means making it possible to push the waste toward this shredder;
- the receptacle for loading waste has a constant cross-section between a waste loading opening and a communication opening with the shredder; and
- said pushing means is a plate translatable in the waste loading receptacle, parallel to the axis along which this receptacle has said constant cross-section, this plate having dimensions such that only an interstice exists between the edge of the plate and the walls defining said waste loading receptacle; the plate is movable between a withdrawn position, in which it is able to be freed from said waste loading opening, and an end-of-travel position, in which it is situated near said communication opening;
- the machine comprises a sealing gasket movable between a retracted position, in which this seal does not hinder the mobility of the plate in the waste loading receptacle, and a sealing position, in which the seal produces, in said end-of-travel position of the plate, sealing between the plate and the walls of said receptacle.

The plate makes it possible, through its movement, to push all of the waste toward the shredding compartment, without requiring repeated actuation by an operator as with a sleeve according to the prior art. The interstice formed by this plate with the walls of the receptacle eliminates the risk of waste, or fragments of waste, rising up the shredder, passing above it. In said end-of-travel position, there is no longer a risk of fragments of shredded waste becoming jammed between the plate and the walls of the receptacle, and the machine does not comprise any hollow seat in which such fragments may accumulate.

Furthermore, the sealing gasket makes it possible to temporarily separate the receptacle and the shredding compartment, to disinfect and sterilize the shredding compartment under conditions not required for said receptacle. The assembly makes it possible for the waste loading receptacle to be disinfected and sterilized by the same disinfection and sterilization means as those disinfecting and sterilizing the shredding compartment and, when the machine comprises one, the lower receiving tub, sterilizing and discharging the shredded waste.

The sealing gasket may in particular be inflatable, such that the passage of this sealing gasket from said retracted position to said sealing position is done by inflating this sealing gasket and, conversely, the passage of this sealing gasket from said sealing position to said retracting position is done by deflating this sealing gasket.

According to one possibility, the sealing gasket is housed in a seat arranged in the walls defining the waste loading receptacle. In said sealing position, this sealing gasket then presses on the edge wall of said plate, this edge being smooth.

According to another possibility, the sealing gasket is housed in a seat arranged in the edge wall of said plate and then presses, in said sealing position, on the walls defining the waste loading receptacle. These walls are then smooth, such that there is no risk of accumulation of waste fragments. The sealing gasket may, in the retracted position, rub slightly against the walls of the receptacle and thus form a means for scraping these walls.

The machine may comprise means for blocking the plate in said end-of-travel position, in particular in the form of at least one latch engaging the plate and at least one of the walls defining said waste loading receptacle.

These blocking means immobilize the plate in this end-of-travel position and greatly reduce or eliminate the exertion of wearing forces on the sealing gasket.

Preferably, in said withdrawn position, the plate is completely housed in a cover comprised by the machine, this cover being movable between a position covering said waste loading opening, in which it closes that opening, and a retracted position, in which it does not hinder the loading of waste in said receptacle.

The plate can thus be completely freed from this opening, which allows easy loading of the waste.

Preferably, the means for actuating the plate comprise at least two series of crossed-bars pivotally connected to one another, on two opposite sides of the plate.

Such crossed-bars allow perfect guidance of the plate between its aforementioned withdrawn and end-of-travel positions.

According to another aspect of the invention,
the shredder is housed in a moving drawer sliding inside a receiving compartment comprised by the structure of the machine, this receiving compartment being defined by side walls and a rear wall, which comprises an opening;
the drawer has a distal boss able, in the fully engaged position of this drawer in said receiving compartment, to be engaged in an adjusted manner in said opening comprised by said rear wall;
the machine comprises a cap able to envelop the part of the distal boss that protrudes past said rear wall in the fully engaged position of the drawer in said receiving compartment, this cap being provided with a flange intended to be bolted on said rear wall, this flange having, at its inner edge, a beveled surface, and
the machine comprises a seal able to be engaged in an adjusted manner around said part of the distal boss that protrudes past said rear wall in the fully engaged position of the drawer in said receiving compartment, until it comes into contact with said rear wall and is pressed by said beveled surface of the cap when this cap is bolted to said rear wall.

The assembly of the shredder in the machine is thus done by engaging the drawer that contains the shredder in the shredding compartment, until said distal boss is engaged in an adjusted manner through said opening comprised by said rear wall. The seal is next placed around this boss until it is in contact with this rear wall, then the cap is placed on the boss and is bolted to this rear wall so as to press the seal.

The invention therefore consists of providing two structures around the shredder, said drawer and said receiving compartment, and providing a very strong distal connection of this drawer to this receiving compartment, by pressing of said seal over its entire periphery. This connection makes it possible to create sealing between the inside and the outside of the tub. Furthermore, this connection makes it possible to produce isostatic mechanical blocking of said two structures, which makes it possible, if the geometry of the shredder or the tub is not perfect (which may happen, given that some of these parts are made by mechanized welding), to react the excessive play that would then exist between the rear part of the shredder and said opening. This same isostatic mechanical blocking also makes it possible to react a perpendicularity or parallelism flaw between the bearing face against the seal and said boss. In other words, when the seal is pressed, it will not create stresses on the shredder and will simply be placed plastically around said boss comprised by the shredder.

According to still another aspect of the invention,
the shredder is formed by at least two parallel series of contrarotating knives, the knives of one series alternating with the counter-knives of that same series, and the knives of a first series cooperating with the counter-knives of another adjacent series, and vice versa, and
at least one knife comprises at least one cell emerging in at least one of its faces turned toward the adjacent counter-knife, or at least one counter-knife comprises at least one cell emerging in at least one of its faces turned toward the adjacent knife, this cell being intended to be filled with lubricating grease and to thus form a grease reserve.

Thus, when a series of sterilization and disinfection cycles implementing a hot fluid, in particular steam, tends to reduce or even eliminate the quantity of grease present in the interface between a knife and the adjacent counter-knife, the subsequent rotation of the knife relative to the adjacent counter-knife causes a withdrawal of grease in that cell due to the viscosity of said grease, and therefore recharging of that interface with grease. As a result, the interruptions of the machine to recharge the interfaces of the knives and counter-knives with grease can be significantly spaced out.

Such a cell may emerge in only one of the faces of a knife or a counter-knife; preferably, however, this cell emerges in both faces of a knife or a counter-knife.

Preferably, a cell is arranged in each counter-knife and emerges in both faces of said counter-knife.

According to still another aspect of the invention,
the shredder is formed by at least two parallel series of contrarotating knives, the knives of one series alternating with the counter-knives of that same series, and the knives of a first series cooperating with the counter-knives of another adjacent series, and vice versa; the edge of each counter-knife turned toward the associated knife is an arc of circle and teeth comprised by the associated knife travel along this edge; and
at least one counter-knife has a notch arranged in it, emerging in this same arc of circle edge, and situated on the downstream side of this edge relative to the passage direction of the waste between the series of knives and counter-knives, this notch forming a tip oriented from the upstream side of the counter-knife.

This tip constitutes a catching zone for a fragment of waste present between the knife and the counter-knife and makes it possible to retain that fragment until passage of the consecutive tooth of the knife across from that tip, which makes it possible to perform shearing or additional shredding of that fragment.

When the set of counter-knives comprised by the shredder has such a notch, and therefore such a tip, the shredder not only comprises a first shearing zone at the teeth of the knives and a second shearing zone between the edges of the teeth of the knives and the upper edges of the counter-knives, but also a third shearing zone between said tips and said consecutive teeth of the knives as well as a fourth active zone, made up of the alternating arrangement of said tips of one counter-knife at an adjacent counter-knife. These tips make up calibration zones in the form of a sort of comb, which allow the shredded waste to be driven again into the aforementioned shearing zones if this waste has dimensions larger than the dimensions of the passage zone initially defined.

The effectiveness of the obtained shredding is thus greatly improved and makes it possible to eliminate any need for calibration downstream from the shredder.

The invention will be well understood, and other features and advantages thereof will appear, in reference to the appended diagrammatic drawing, showing, as a non-limiting example, one preferred embodiment of the machine in question.

BRIEF DESCRIPTION OF THE DRAWINGS

In this drawing.

DESCRIPTION OF THE PREFERRED EMBODIMENTS

Figure 1:
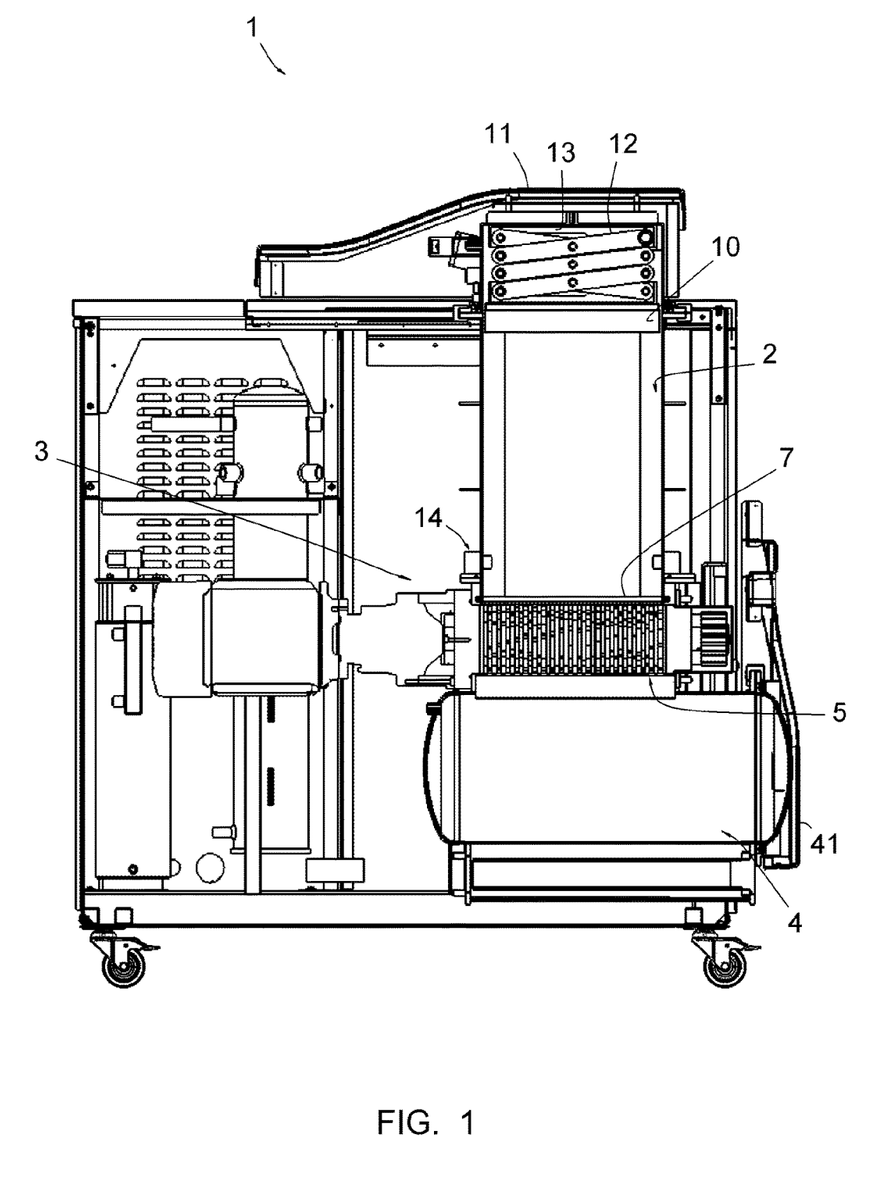
FIG. 1 is a side view of this machine, in longitudinal cross-section, a pressing plate comprised by this machine being in a withdrawn position.
Figure 2:
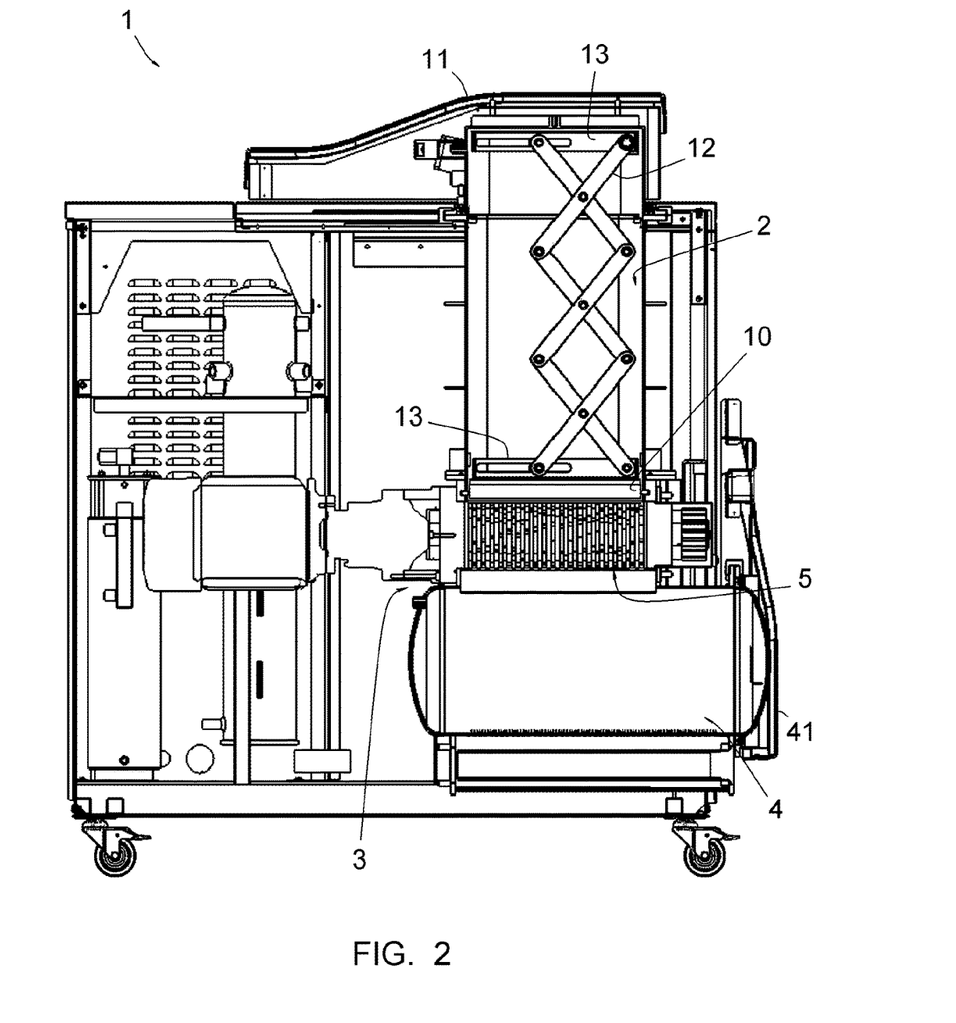
FIG. 2 is a view of the machine similar to FIG. 1, said pressing plate being in a lowering end-of-travel position.
Figure 3:
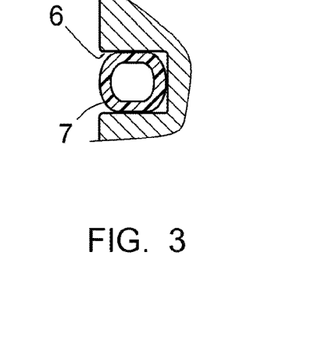
FIG. 3 is a very enlarged view of the machine situated at this end-of-travel position, said pressing plate not being in this same position.
Figure 4:
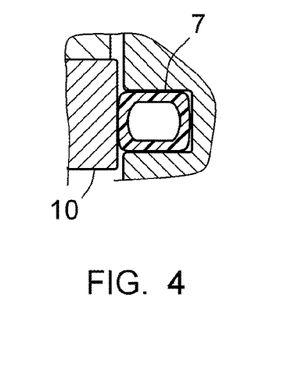
FIG. 4 is a view similar to FIG. 3, said pressing plate being in said end-of-travel position.
Figure 5:
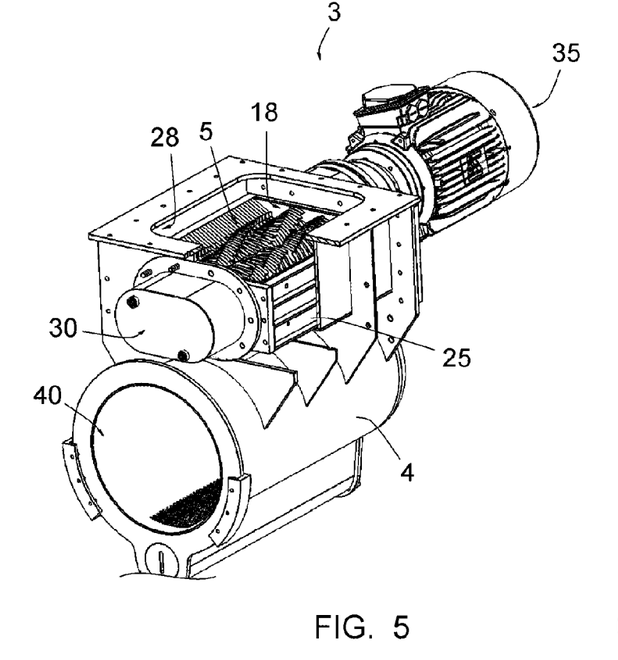
FIG. 5 is a perspective view of a shredding assembly and a lower tub for receiving shredded waste, comprised by the machine.
Figure 6:
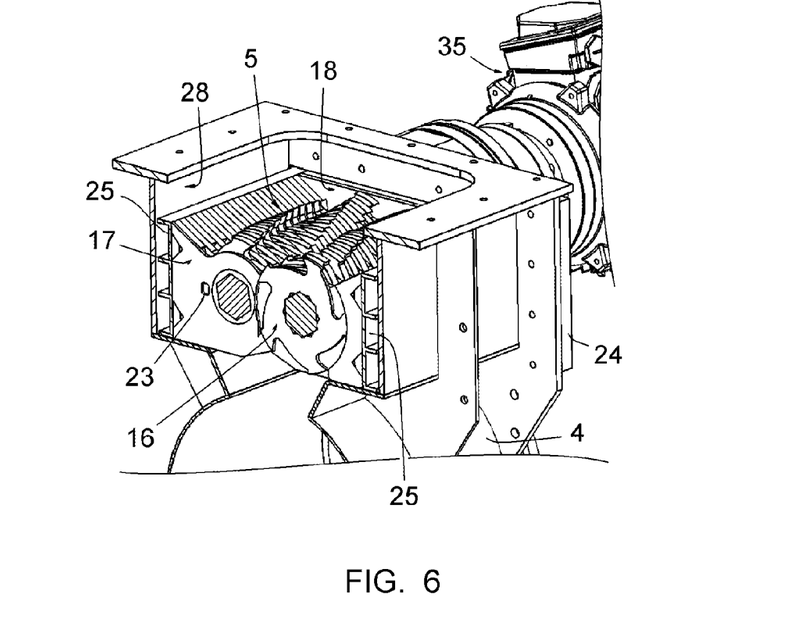
FIG. 6 is an enlarged cross-sectional view of this shredding assembly.
Figure 7:
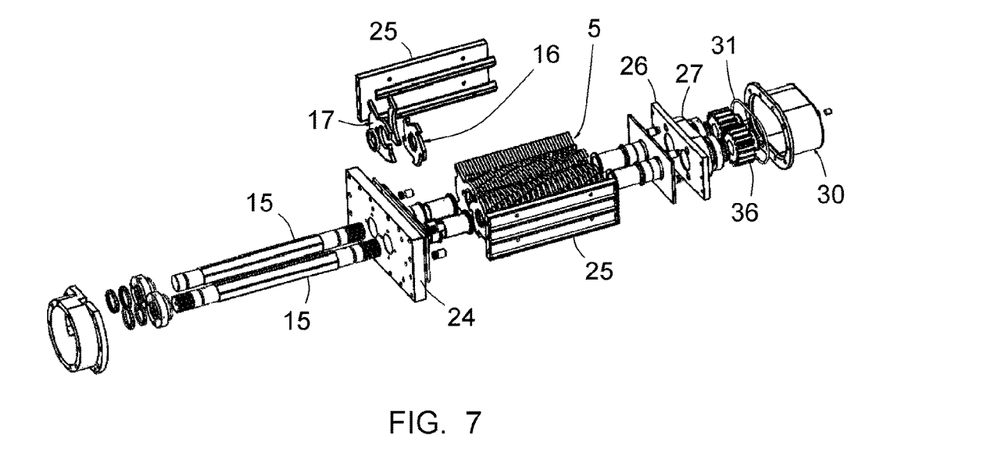
FIG. 7 is an exploded view of various members making up the shredder comprised by the machine.
Figure 8:
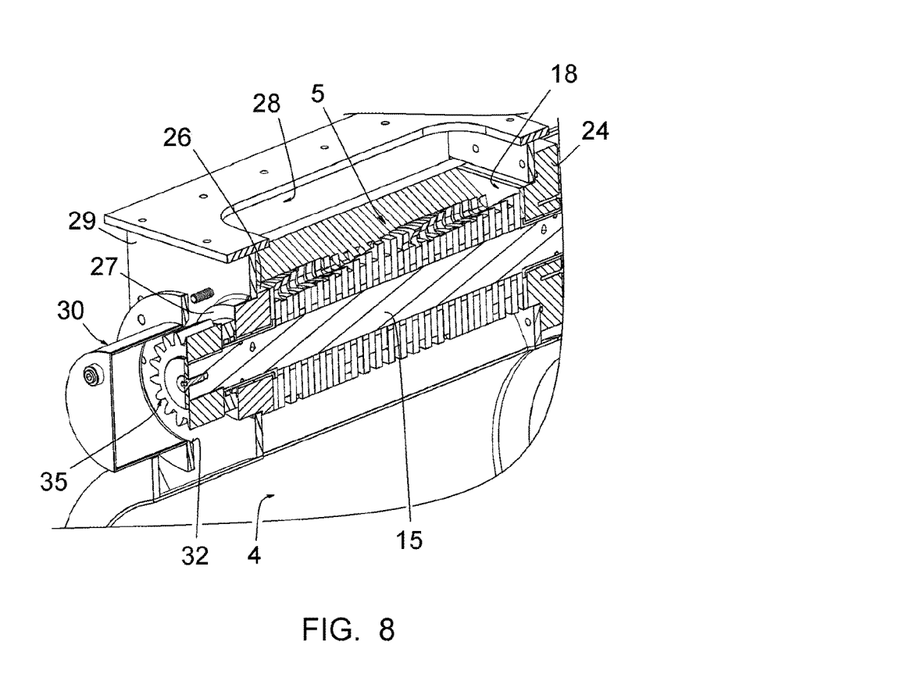
FIG. 8 is a view of the shredding compartment similar to FIG. 6, in longitudinal section passing through one of the shafts comprised by the shredder.

FIGS. 1 and 2 show a machine 1 for treating infectious waste, in particular medical waste, essentially comprising a waste loading receptacle 2, a shredding assembly 3 for shredding this waste and a lower tub 4 for receiving, sterilizing and discharging the shredded waste. The other elements visible in these figures (electrical cabinet, steam generating unit, etc.) are well known in themselves and are not part of the invention; they will therefore not be described more specifically.

The receptacle 2 has a constant cross-section between an upper waste loading opening and a lower communication opening with a shredding compartment, including a shredder 5, comprised by the shredding assembly 3.

In the version of the machine shown in FIGS. 1 to 4, the receptacle 2 comprises, slightly withdrawn from this lower opening, a hollow seat 6 (see FIGS. 3 and 4) in which an inflatable seal 7 is placed. This seal 7 defines a closed inner chamber that is connected to a pressurized fluid source (not shown). Supplying this chamber with this fluid makes it possible to expand the seal 7, causing it to go from a retracted position, shown in FIG. 3, in which this seal does not protrude from the seat 6, to a sealing position, shown in FIG. 4, in which this seal protrudes from the seat 6 and is pressed against the edge walls of a pressing plate 10, described later, thus producing sealing between this plate 10 and the walls of this receptacle 2.

Figure 10:
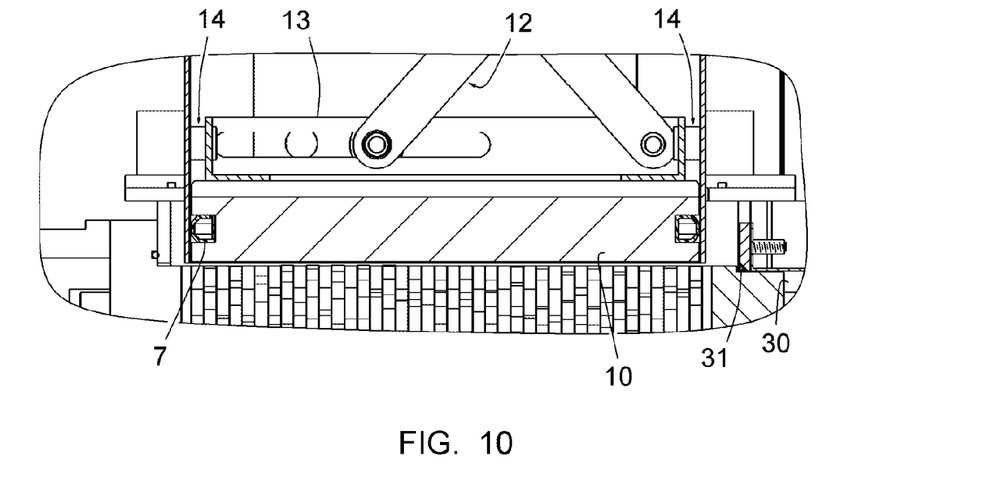
FIG. 10 is a side view of this machine, in longitudinal section, according to one alternative embodiment of a sealing gasket comprised by said pressing plate.

In the alternative embodiment of the machine 1 shown in FIG. 10, the seat 6, containing the seal 7, is arranged in the edge walls of the plate 10 and the portions of the walls of the receptacle 2 situated slightly withdrawn from said lower opening are smooth and in the continuation of the rest of the walls of the receptacle 2.

In association with the receptacle 2, the machine comprises a pressing assembly for the waste in this receptacle, and an upper sliding cover 11.

The waste pressing assembly comprises said pressing plate 10, two series of pivotally-linked cross bars 12 and structures 13 connecting these series of cross bars 12 to the plate 10 on the one hand, and to the cover 11 on the other hand.

As shown in FIGS. 1, 2 and 10, the pressing plate 10 has dimensions such that only an interstice exists between its edge walls and the walls defining the receptacle 2. This plate 10 is translatable in the receptacle 2, through the unfolding/folding of the crossed-bars 12, parallel to the axis along which this receptacle 2 has said constant cross-section. This mobility occurs between an upper withdrawn position, shown in FIG. 1, in which it is completely retracted in the cover 11, and a lower end-of-travel position, shown in FIG. 2, in which it is situated near said communication opening, and in which the seal 7 is able to perform the aforementioned sealing.

The cover 11 is inwardly hollow, so as to house the plate 10, the series of crossed-bars 12, said connecting structures 13 and a jack for actuating the crossed-bars 12. It is movable by sliding between the illustrated position completely covering the waste loading opening, in which it closes that opening tightly, and a lateral withdrawn position, in which it completely frees said opening and therefore does not hinder the loading of waste in the receptacle 2.

Said connecting structures 13 are formed from frames made of corner profiles; the walls on which the branches of the respective crossed-bars 12 are mounted comprise apertures making it possible for the pivot point of one branch of the corresponding crossed-bar 12 to come closer to and further from the pivot point of the other branch of that same crossed-bar.

The machine 1 also comprises latches 14 mounted on two opposite walls of the receptacle 2, both of which are, in said lower end-of-travel position, received in corresponding strikes arranged in the frames forming said connecting structures 13.

In reference to FIGS. 5 to 8, it appears that the waste shredding assembly 3 essentially comprises the shredder 5, formed from two parallel shafts 15 each including a series of knives 16 and alternating counter-knives 17, a shredding compartment 18 housing this shredder 5, and an actuating assembly for actuating these shafts 15 in a contrarotating manner.

Figure 9:
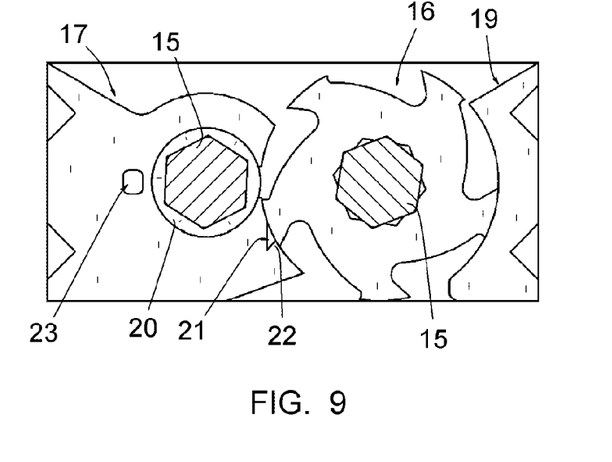
FIG. 9 is a sectional front view of a knife and a counter-knife comprised by the shredder.

The knives 16 in one series cooperate with the counter-knives 17 in the other series, and vice versa, as particularly shown in FIG. 9.

In reference to this FIG. 9, it appears that the shafts 15 have a hexagonal section and that each knife 16 has a central opening formed by the superposition of two hexagonal apertures, offset from one another by 30°, the dimensions of these apertures being such that they allow the adjusted engagement, and wedging, of the knives 16 on the shafts 15. As particularly shown in FIG. 8, the successive knives 16 of a same series are offset by 30 degrees, from one knife to an adjacent knife in the same series.

Each knife 16 has five protruding teeth, forming cutting edges.

Each counter-knife 17 is engaged on the corresponding shaft 15 and comprises a circular opening in which a sliding ring 20 with a hexagonal opening and circular periphery is housed, this sliding ring 20 being mounted on the shaft 15. The counter-knife 17 is thus not movable in the compartment 18 when the corresponding shaft 15 is rotated.

On the side opposite the counter-knife 17 relative to the knife 16, the shredder 5 has an additional counter-knife 19.

The counter-knife 17 has an arc of circle edge turned toward the associated knife 16, along which the teeth travel comprised by that knife 16, and has a notch 21 arranged in it, emerging in this same arc of circle edge, and situated on the downstream side of the shredder 5 relative to the passage direction of the waste between the series of knives 16 and counter-knives 17. This notch 21 thus forms a tip 22 oriented on the upstream side of the counter-knife 17.

The counter-knife 17 also comprises a cell 23 emerging in both faces of the counter-knife 17 turned toward the knives 16 that are adjacent to said counter-knife 17 in the same series of knives and counter-knives. This cell 23 is filled with lubricating grease and thus forms a grease reserve, as explained later.

The counter-knife 19 also has an arc of circle edge turned toward the associated knife 16, along which the teeth travel comprised by that knife 16. It is fastened on a wall 25 laterally defining the shredding compartment 18.

In reference to FIGS. 5 to 8, it appears that this compartment 18 is defined by a forward wall 24, two side walls 25 and a rear wall 26 including a distal boss 27. In the assembled state, the assembly forms a drawer that is placed in a receiving compartment 28 having dimensions adjusted to those of the drawer, the walls defining this receiving compartment 28 forming a body with the tub 4. This receiving compartment 28 is in particular defined by a rear wall 29 that comprises an opening able to receive the boss 27 in an adjusted manner in the fully engaged position of the drawer, and also comprises a series of threaded rods fastened to it around this opening.

The machine 1 also comprises a cap 30 and a seal 31.

Figure 11:
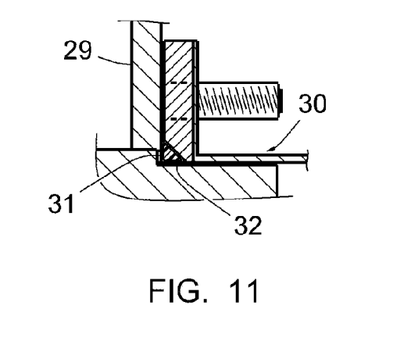
FIG. 11 is an enlarged view of a detail appearing in this FIG. 10.

The cap 30 is dimensioned to envelop the boss 27 in an adjusted manner and is provided with a flange intended to be engaged on the threaded rods secured to the wall 29 and to be bolted to the latter. As shown in FIG. 11 in particular, this flange has, at its inner edge, a beveled surface 32.

The seal 31 is in the form of a ring and is dimensioned to be engaged in an adjusted manner around the boss 27 until it comes into contact with said rear wall 29. When the cap 30 is bolted to the latter, said beveled surface 32 presses this seal 31 over its entire periphery, as shown more particularly in FIG. 11.

The actuating assembly of the shredder 5 includes a motor 35 acting on one of the shafts 15, and two pinions 36, wedged on the shafts 15 and meshing with one another such that the driving of one shaft 15 generated by the motor 35 is transmitted to the other shaft 15.

The tub 4 has a longitudinal opening 40 through which the shredded waste can be removed from it. This opening 40 is closed by a sliding cover 41, movable between a tight closing position of this opening and a withdrawn position, in which this cover 41 completely frees that opening.

As will be understood, the plate 10 makes it possible, through its movement, to push all of the waste toward the shredding compartment 18, without requiring repeated actuation by an operator as with a shaft according to the prior art. The interstice formed by this plate 10 with the walls of the receptacle 2 eliminates, jointly with the sealing made possible by the seal 7, any risk of waste, or fragments of waste, rising up the shredder 5 and passing above this plate 10, or of such waste or fragments accumulating in a hollow seat. The crossed-bars 12 allow perfect guidance of the plate 10 between its withdrawn and end-of-travel positions, preventing any risk of jamming of this plate in this receptacle.

The plate 10 and the seal 7 further make it possible to temporarily separate the receptacle and the shredding compartment 18, to disinfect and sterilize the shredding compartment under conditions not required for the receptacle 2. The latches 14 immobilize the plate 10 in this end-of-travel position, which protects the seal 7 from the wearing forces generated by this disinfection and sterilization.

The assembly of the shredder 5 in the machine 1 is done by engaging the drawer that contains the shredder in the receiving compartment 28, until the boss 27 is engaged through the passage opening arranged in the rear wall 29. The seal 31 is next placed around this boss 27 until it is in contact with this rear wall 29, then the cap 30 is placed in an adjusted manner on the boss 27 and is bolted to this rear wall 29 so as to press the seal 31 via the beveled wall 32.

Two structures are thus provided around the shredder 5, said drawer 25 and said receiving compartment 28, and the pressing of the seal 31 over its entire periphery, by the cap 30, makes it possible to produce a very strong and isostatic distal connection of this drawer to this receiving compartment. This connection is perfectly able to withstand repeated forces experienced by the shredder 5, while allowing easy disassembly of the shredder, by simple disassembly of the cap 30 and removal of the seal 31 from around the boss 27.

Each cell 23 allows a recharge of the interface between a counter-knife 17 and the two adjacent knives 16 when a series of sterilization and disinfection cycles implementing steam tends to reduce or even eliminate the quantity of grease present in these interfaces. As a result, the interruptions in the use of the machine 1 to recharge the interfaces of the knives 16 and counter-knives 17 with grease can be significantly spaced out.

Furthermore, the tip 22 constitutes a catching zone for a fragment of waste present between a knife 16 and a counter-knife 17 and makes it possible to retain that fragment until passage of the consecutive tooth of the knife 16 across from that tip 22, which makes it possible to perform shearing or additional shredding of that fragment. The effectiveness of the obtained shredding is greatly improved and makes it possible to eliminate any need for sieving downstream from the shredder 5.

As appears from the preceding, the invention provides a machine 1 having the aforementioned decisive advantages relative to the similar machines of the prior art.

Of course, the invention is not limited to the embodiment described above as an example, but encompasses all embodiments covered by the appended claims.

What is claimed is:

1. A machine for treating waste, comprising:
   a waste loading receptacle for loading waste, comprising walls defining the waste loading receptacle,
   a shredding assembly for shredding said waste, including a shredder, and a pusher making it possible to push the waste toward the shredder, the pusher including a plate and an actuator for actuating the plate in the receptacle;
   the receptacle has a constant cross-section between a waste loading opening and a communication opening with the shredder, the waste loading opening being an upper opening; and the plate is translatable in the waste loading receptacle, parallel to the axis along which the receptacle has said constant cross-section, the plate having an edge wall and having dimensions such that only an interstice exists between the edge wall of the plate and the walls defining said waste loading receptacle; the plate is movable between a withdrawn position, where the plate is able to be freed from said waste loading opening, and an end-of-travel position, where the plate is situated adjacent said communication opening;

the machine comprises a sealing gasket within the waste loading receptacle movable between a retracted position and a sealing position;

wherein in the retracted position, the sealing gasket does not hinder the mobility of the plate in the waste loading receptacle, and in the sealing position, the sealing gasket fills the interstice and produces, in said end-of-travel position of the plate, sealing between the plate and the walls of said receptacle;

wherein, in the withdrawn position, the pusher is completely housed in a cover of the machine, the cover being movable between a position covering the waste loading opening, in which the cover closes the opening, and a retracted position, in which the cover does not hinder the loading of waste in said receptacle.

2. The machine according to claim 1, wherein the sealing gasket is inflatable, such that the passage of the sealing gasket from said retracted position to said sealing position is done by inflating the sealing gasket, and, conversely, the passage of the sealing gasket from said sealing position to said retracting position is done by deflating the sealing gasket.

3. The machine according to claim 1, wherein the sealing gasket is housed in a seat arranged in the edge wall of said plate and then presses, in said sealing position, on the walls defining the waste loading receptacle, and wherein the walls defining the waste loading receptacle are smooth.

4. The machine according to claim 1, wherein the machine comprises means for blocking the plate in said end-of-travel position in the form of at least one latch engaging the plate and at least one of the walls defining said waste loading receptacle.

5. The machine according to claim 1, wherein the cover is a sliding cover, and wherein the cover is slidably movable between the position covering the waste loading opening and the retracted position.

6. The machine according to claim 1, wherein the actuator for actuating the plate comprise at least two series of crossed-bars pivotally connected to one another, on two opposite sides of the plate.

7. The machine according to claim 1, wherein the waste is infectious medical waste.

8. The machine of claim 3, wherein the sealing gasket is dimensioned so as to protrude from the seat arranged in the edge wall of the plate such that, in the retracted position, the sealing gasket rubs against the walls of the waste loading receptacle.

9. The machine of claim 1, wherein the sealing gasket is housed in a seat arranged in the walls defining the waste loading receptacle, the seat being positioned such that, in a sealing position of the plate, the sealing gasket presses on the edge wall of said plate, the edge wall being smooth.

* * * * *